United States Patent Office 3,433,763
Patented Mar. 18, 1969

3,433,763
DIHYDROCARBYL TIN MALEIC ACID ESTERS AND THEIR USE AS PVC STABILIZERS
Kozaburo Suzuki, Kobe-shi, Toshio Seki, Osaka-shi, and Yohei Kawakami, Osaka-fu, Japan, assignors to Nitto Kasei Co., Ltd., Osaka, Japan, a corporation of Japan
No Drawing. Filed Nov. 5, 1965, Ser. No. 506,572
Claims priority, application Japan, Nov. 5, 1964, 39/62,318
U.S. Cl. 260—45.75  7 Claims
Int. Cl. C08g 45/62

ABSTRACT OF THE DISCLOSURE

In accordance with certain of its aspects this invention relates to novel compositions and to a novel process for stabilization of vinyl chloride resins against heat and light by adding to vinyl chloride resin 0.5 to 5% by weight of a stabilizer consisting essentially of an organotin compound having the general formula

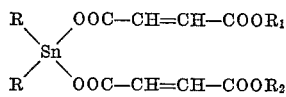

wherein R represents a member selected from the group consisting of alkyl containing from 1 to 18 carbon atoms, aryl and benzyl radicals and $OR_1$ and $OR_2$ each represents a member selected from the group consisting of (a) the organic residue of an alcohol containing 8–16 carbon atoms and including an aromatic substituent in one of the $\alpha$ and $\beta$ positions, the rate of autooxidation of said alcohol being more than $20.0 \times 10^{-6}/l$. sec. at a temperature of 80° C. in the presence of benzoyl peroxide as an initiator, and (b) the organic residue of a phenol containing 7–24 carbon atoms and including 1–3 substituents containing from 1–8 carbon atoms selected from the group consisting of alkyl and alkoxy radicals said phenol having an oxidation potential of less than 0.9 volt.

---

This invention relates to the stabilization of vinyl chloride resins.

Recently various stabilizers have been employed as stabilizers of polyvinyl chloride resins; for example, tin compound stabilizers such as diorganotin dilaurate, diorganotin maleate, or diorganotin bis(ester maleate), etc., have been used commonly. In the process of stabilization of vinyl chloride resins employing the conventional organotin compounds, however, it was necessary to prevent oxidative deterioration by employing an antioxidant. Because of this fact, there were many problems in accomplishing the full purpose for using the conventional stabilizers.

Conventionally used diorganotin maleates or diorganotin bis(ester maleate), which contain dienophilic maleic acid residues or dienophilic ester maleate residues in their molecules, were very valuable as stabilizers, since they act sensitively on the double bond formed during treatment of the vinyl chloride resins. As is well known to those skilled in the art, since vinyl chloride resins, e.g. polyvinyl chloride, copolymers of vinyl chloride with vinyl acetate, polybutadiene, copolymer of acrylonitrile and styrene, or terpolymer of acrylonitrile, styrene and butadiene, vinyl chloride mixed and modified with up to 30% by weight chlorinated polyolefin etc., may be oxidized during or after treatment, they have imperfections with respect to color change which occurs during treatment or which change the physical properties of manufactured goods with the passage of time.

In order to prevent this oxidation diorganotin bis(ester maleate) was used conjointly with a hindered phenol, so that the favorable stabilization including prevention of oxidation might be attained. However hindered phenols may be fairly sublimated and dissipated at the general temperature for treatment of vinyl chloride resins, i.e. above 185° C., and furthermore they do not fully maintain their stabilizing effect against changes in the manufactured goods with the passage of time due to heat or light over a period of long hours at room temperature or 60° C.

These phenomena are generally considered undesirable because of the generally few number of carbon atoms in the substituents of a typical antioxidant, a hindered phenol, and also because the hydroxy group is stericly hindered by the influence of an alkyl radical.

It is an object of this invention to provide diorganotin bis(ester maleates) having ester maleate radicals which contain alcohol or phenol residues which provide a high degree of stabilization characteristics including remarkable dienophilic properties and antioxidative properties for vinyl chloride resins. Other objects of this invention will be apparent on inspection of the following description.

In accordance with certain of its aspects this invention relates to a novel process for stabilization of vinyl chloride resins against heat and light by adding to vinyl chloride resin 0.5 to 5% by weight of a stabilizer consisting essentially of an organotin compound having the general formula

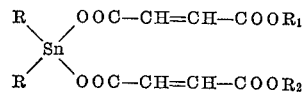

wherein R represents a member selected from the group consisting of alkyl containing from 1 to 18 carbon atoms, aryl and benzyl radicals and $OR_1$ and $OR_2$ each represents a member selected from the group consisting of (a) the organic residue of an alcohol containing 8–16 carbon atoms and including an aromatic substituent in one of the $\alpha$ and $\beta$ positions, the rate of autooxidation of said alcohol being more than $20.0 \times 10^{-6}/l$. sec. at a temperature of 80° C. in the presence of benzoyl peroxide as an initiator, and (b) the organic residue of a phenol containing 7–24 carbon atoms and including 1–3 substituents containing from 1–8 carbon atoms selected from the group consisting of alkyl and alkoxy radicals said phenol having an oxidation potential of less than 0.9 volt.

The diorganotin bis(ester maleate) of the instant invention may have superior properties as a stabilizer of vinyl chloride resin. The ester maleate radical of its molecule possesses not only dienophilic property but also possesses an antioxidative property because of its containing an oxidizable substituted phenol residue or an oxidizable alcohol residue in the form of ester. Furthermore the stabilizing compound does not sublimate and dissipate at the temperature of treatment of vinyl chloride resins.

The parent alcohol which may meet aforesaid conditions may possess an aromatic substituent especially in the $\alpha$ or $\beta$ position of the alcohol. Furthermore, the alcohol residue and the phenol residue which may be present in the diorganotin compound to be employed in practice of this invention also may have the total number of carbon atoms of said alcohol and phenol limited in connection with physical properties desired for processing conditions and compatibility with the resins.

In accordance with certain aspects of this invention novel stabilizing compounds for vinyl chloride resins may be provided which may be characterized by the general formula

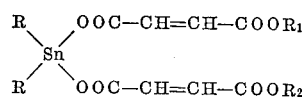

Illustrative R, OR₁, and OR₂ in the general formula of diorganotin-bis-(ester maleate) may be as follows: Typical R may include methyl, butyl, octyl, phenyl, benzyl, etc. Typical OR₁ and OR₂ may include organic residues of 8 to 16 carbon parent alcohols bearing an aromatic substituent in one of the α and β positions, such as 2-β-naphthyl carbinols, 1-(α-and β-naphthyl) ethyl alcohols, 2-(α-and β-naphathyl) ethyl alcohols, α-phenylethyl alcohol, hydroxy cinnamyl alcohols, diphenyl carbinol, p-methylbenzyl alcohol, and residues of 7 to 24 carbon parent phenols bearing 1 to 3 substituents selected from the group consisting of alkyl and alkoxy containing 1 to 8 carbon atoms, such as 2-t-octyl phenol, 2,6-di-t-butyl-p-cresol, 2,6-di-t-butyl-4-methoxy phenol, 2,4-di-t-butyl-6-methyl phenol, 2-t-butyl-4-methoxy phenol, 2,4,6-trimethyl phenol, 2,6-diisopropyl-4-ethyl phenol, 2,4-dimethyl phenol, and 2,6-di-t-butyl phenol, 2,4,6-tri-n-hexyl phenol, etc. Each R group may be the same or different, preferably they are the same. OR₁ and OR₂ may be the same or different; preferably too they are the same.

Typical diorganotin-bis(ester maleates) which may be employed in the practice of this invention include:

dibutyltin bis(α-phenylethyl maleate)
dioctyltin bis[2-(β-naphthyl) ethyl maleate]
dioctyltin bis(o-methylbenzyl maleate)
dibutyltin bis(o-methylbenzyl maleate)
dimethyltin bis[1-(α-naphthyl) ethyl maleate]
dioctyltin bis[1-(β-naphthyl)ethyl maleate]
diphenyltin bis(p-hydroxycinnamyl maleate)
diphenyltin bis(diphenylmethyl maleate)
dibutyltin bis(β-naphthylmethyl maleate)
dibutyltin bis(2-t-octylphenyl maleate)
dibenzyltin bis(4-phenyl-α-naphthylmethyl maleate)
dibutyltin bis(2,6-di-t-butyl-4-methylphenyl maleate)
dibutyltin bis(2,6-di-t-butyl-4-methoxyphenyl maleate)
dibutyltin bis(2,4-dimethylphenyl maleate)
dibutyltin bis(2,4-di-t-butyl-6-methylphenyl maleate)
dibutyltin bis(2-t-butyl-4-methoxyphenyl maleate)
dioctyltin bis(2,4,6-trimethylphenyl maleate)
dimethyltin bis(2,6-diisopropyl-4-ethylphenyl maleate)
dibenzyltin bis(2,6-di-t-butylphenyl maleate)
(butyl) (octyl) tin bis(α-phenylethyl maleate)
dibutyltin (α-phenylethyl maleate) (p-methylbenzyl maleate)
(butyl) (benzyl) tin(α-phenylethyl maleate) (p-methylbenzyl maleate)
dioctyltin bis(2,4,6-tri-n-hexylphenyl maleate)

The organotin compounds of this invention may be prepared by mixing in an inert solvent maleic anhydride with a compound selected from the group consisting of an alcohol having 8 to 16 carbon atoms, which includes an aromatic substituent in one of the α and β positions, the rate of autooxidation of the alcohol being more than $20.0 \times 10^{-6}/l.$ sec. at a temperature of 80° C. in the presence of benzoyl peroxide as an initiator and a phenol having 7 to 24 carbon atoms which includes 1 to 3 substituents selected from the group consisting of alkyl and alkoxy containing 1 to 8 carbon atoms, the oxidation potential of the phenol being less than 0.9 volt; heating mixture thereby forming ester malete; reacting said ester maleate with (diorganotin) oxide thereby forming diorganotin bis(ester maleate); and recovering said diorganotin bis(ester maleate).

Typical solvents which may be employed in the above process include benzene, toluene, etc. The half-acid ester maleate may be recovered prior to reaction with the organotin compound and that reaction carried out in the absence of solvent. Alternatively, the reaction with organotin compound may continue in the presence of solvent.

The parts described in the following examples are parts by weight.

EXAMPLE 1

Preparation of dibutyltin bis(2-t-butyl-4-methoxyphenyl maleate)

90 parts (0.5 mole) of 2-t-butyl-4-methoxy phenol, 49 parts (0.5 mole) of maleic anhydride and 433 parts of toluene may be placed in a three-necked flask, heated to 110° C. and stirred for about 2.5 hours thereby obtaining as a transparent yellow liquid 2-t-butyl-4-methoxyphenyl maleate. 62 parts (0.25 mole) of dibutyltin oxide and an additional 260 parts of toluene may be added to react with the maleate easter and the mixture heated under reflux with stirring until water produced in the reaction is removed. The toluene solvent may then be removed by heating in vacuo, thereby yielding 183 parts (93.5%) of dibutyltin bis(2-t-butyl-4-methoxyphenyl maleate), a dark brown-colored viscous liquid. The tin content calculated for the product is 15.15% and that found is 15.02%.

EXAMPLE 2

Preparation of dibutyltin bis(o-methylbenzyl maleate)

48.9 parts (0.4 mole) of D,L-o-methylbenzyl alcohol, 39.2 parts (0.4 mole) of maleic anhydride and 260 parts of toluene may be mixed in a flask and heated and stirred for 1 hour thereby obtaining o-methylbenzyl maleate. 49.8 parts (0.2 mole) of dibutyltin oxide may be added to react with the maleate ester and the mixture heated under reflux with stirring until water produced in the reaction is removed. The toluene solvent may then be removed by heating in vacuo, thereby yielding 125 parts (92.8%) of dibutyltin bis(o-methyl-benzyl maleate). The tin content calculated for the product is 17.65% and that found is 17.40%.

Other organotin bis(ester maleates) of the invention such as dioctyltin bis[1-(β-naphthyl) ethyl maleate], dioctyltin bis(o-methylbenzyl maleate), dibutyltin bis(2,4-dimethylphenyl maleate), dibutyltin bis(2,4-di-t-butyl-6-methylphenyl maleate), and dibutyltin bis(2-t-butyl-4-methoxyphenyl maleate) may be prepared in a manner similar to that of the above examples by reacting the appropriate alcohol or phenol with maleic anhydride and reacting the ester thereby formed with the appropriate diorganotin oxide.

EXAMPLE 3

Dibutyltin bis(ester maleate) represented in Table 1 as stabilizer may be separately added in amount of 3 parts by weight to 100 parts by weight of vinyl chloride resin and sheets, having a thickness of 0.5 mm., may be made by milling on a mixing roll at surface temperature of 165° C. The vinyl chloride resin may have a specific gravity of 1.40, a Shore Durometer D hardness of 80 and an ultimate tensile strength of 7000 p.s.i., such as that sold under the trademark Geon 103 EP.

TABLE I

| Stabilizer | At 170° C. after 2 hours | | At 65° C. after 48 hours | |
| --- | --- | --- | --- | --- |
| | Color tone | Absorption of carbonyl group | Color tone | Absorption of carbonyl group |
| Dibutyltin bis-(methyl maleate), control | Yellow | Occurred | Light yellow | Occurred |
| Dibutyltin bis-(2-tert-butyl-4-methoxyphenyl maleate) | Light yellow | Scarcely | Colorless | Scarcely |

EXAMPLE 4

3 parts of dioctyltin bis(ester maleate) described in Table 2 as stabilizer and 0.5 part of liquid paraffin may be added to 100 parts of the vinyl chloride resin as in Example 3 and mixed with 15% by weight of chlorinated polyethylene, followed by milling on a mixing roll at surface temperature of 165° C. for 2 hours, and a similar test to that of Example 3 run. Results so obtained are shown in Table 2.

TABLE 2

| Stabilizer | At 165° C. after 2 hours | |
| --- | --- | --- |
|  | Color tone | Absorption of carbonyl group |
| Dioctyltin bis(octyl maleate), control. | Yellow | Appeared obviously. |
| Dioctyltin bis[1-(β-naphthyl) ethyl maleate]. | Light yellow | Appeared scarcely. |
| Dioctyltin bis (o-methyl benzyl maleate). | do | Do. |

EXAMPLE 5

1 part of stearamide and 3 parts of dibutyltin bis (ester maleate) described in Table 3 may be added to 100 parts of copolymer of vinyl chloride and vinylidene chloride, and films which have a thickness of 0.3 mm. made by use of an extruder. The induction period of oxygen absorption for each of these films at 60° C. may be determined by infra-red absorption spectrum analysis of the carbonyl group. Table 3 indicates the values when the induction period of oxygen absorption of dibutyltin bis(methyl maleate) control as stabilizer is regarded as 1.

TABLE 3

Stabilizer: Induction period of oxygen absorption at 60° C.
- Dibutyltin bis(methyl maleate, control _____ 1
- Dibutyltin bis(2,4-dimethyl phenyl maleate) __ 25
- Dibutyltin bis(2,4-di-t-butyl - 6 - methyl phenyl maleate _____ 28
- Dibutyltin bis(2 - t - butyl - 4 - methoxy phenyl maleate) _____ 40

Although this invention has been disclosed by reference to various specific examples, it will be apparent to those skilled-in-the-art that various modifications and changes may be made thereto which fall within the scope of this invention.

What is claimed is:

1. A stabilized vinyl chloride resin composition containing vinyl chloride resin and 0.5–5% by weight of a stabilizer consisting essentially of an organotin compound having the general formula:

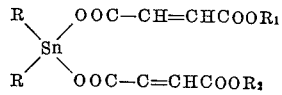

wherein R represents a member selected from the group consisting of alkyl containing 1–18 carbon atoms, phenyl, and benzyl radicals, and $R_1$ and $R_2$ each represent a member selected from the group consisting of 1-(α-naphthyl) ethyl, 1-(β-naphthyl)ethyl, 2-(α-naphthyl) ethyl, 2-(β-naphthyl)ethyl, α - phenylethyl, hydroxycinnamyl, p-methyl-benzyl, napthobenzyl, benzohydryl, 2-t-octyl phenyl, 2,6-di-t-butyl-p-cresyl, 2,6-di-t-butyl-4-methoxy phenyl, 2,4-di-t-butyl-6-methyl phenyl, 2-t-butyl-4-methoxy, phenyl, 2,4,6-trimethyl phenyl, 2,6-diisopropyl-4-ethyl phenyl, 2,4-dimethylphenyl, 2,6-di-t-butyl phenyl, and 2,4,6-tri-n-hexylphenyl radicals.

2. A stabilized vinyl chloride resin composition as claimed in claim 1 wherein said organotin compound is dibutyltin bis(2-t-butyl-4-methoxyphenyl) maleate.

3. A stabilized vinyl chloride resin composition as claimed in claim 1 wherein said organotin compound is dioctyltin bis[1-(β-naphthyl) ethyl maleate].

4. A stabilized vinyl chloride resin composition as claimed in claim 1 wherein said organotin compound is dioctyltin bis(o-methylbenzyl maleate).

5. A stabilized vinyl chloride resin composition as claimed in claim 1 wherein said organotin compound is dibutyltin bis(2,4-dimethyl phenyl maleate).

6. A stabilized vinyl chloride resin composition as claimed in claim 1 wherein said organotin compound is dibutyltin bis(2,4-di-t-butyl-6-methyl phenyl maleate).

7. A stabilized vinyl chloride resin composition as claimed in claim 1 wherein said organotin compound is dibutyltin bis(2-t-butyl-4-methoxy phenyl maleate).

References Cited

UNITED STATES PATENTS 2,830,067   4/1958   Ramsden _____ 260—429.7

FOREIGN PATENTS 87,074   11/1957   Netherlands.

DONALD E. CZAJA, *Primary Examiner.*

V. P. HOKE, *Assistant Examiner.*

U.S. Cl. X.R.
260—429.7, 45.95